United States Patent
Priel et al.

(10) Patent No.: US 9,652,572 B2
(45) Date of Patent: May 16, 2017

(54) METHOD AND APPARATUS FOR PERFORMING LOGIC SYNTHESIS

(71) Applicants: FREESCALE SEMICONDUCTOR, INC., Austin, TX (US); Michael Priel, Netanya (IL); Eliya Babitsky, Caesaria (IL); Asher Berkovitz, Kiryat Ono (IL); Vladimir Nusimovich, Hertzelia (IL)

(72) Inventors: Michael Priel, Netanya (IL); Eliya Babitsky, Caesaria (IL); Asher Berkovitz, Kiryat-Ono (IL); Vladimir Nusimovich, Hertzelia (IL)

(73) Assignee: NXP USA, Inc., Austin, TX (US)

( * ) Notice: Subject to any disclaimer, the term of this patent is extended or adjusted under 35 U.S.C. 154(b) by 25 days.

(21) Appl. No.: 14/758,971

(22) PCT Filed: Jan. 8, 2013

(86) PCT No.: PCT/IB2013/050153
§ 371 (c)(1),
(2) Date: Jul. 2, 2015

(87) PCT Pub. No.: WO2014/108737
PCT Pub. Date: Jul. 17, 2014

(65) Prior Publication Data
US 2015/0339413 A1 Nov. 26, 2015

(51) Int. Cl.
*G06F 17/50* (2006.01)

(52) U.S. Cl.
CPC ........ *G06F 17/505* (2013.01); *G06F 17/5045* (2013.01)

(58) Field of Classification Search
CPC ........................................ G06F 17/50
USPC ....................................... 716/104
See application file for complete search history.

(56) References Cited

U.S. PATENT DOCUMENTS

| | | |
|---|---|---|
| 5,841,663 A | 11/1998 | Sharma et al. |
| 7,120,883 B1 | 10/2006 | Van Antwerpen et al. |
| 2005/0193359 A1 | 9/2005 | Gupta et al. |
| 2006/0117279 A1 | 6/2006 | Van Ginneken et al. |
| 2006/0195822 A1 | 8/2006 | Beardslee et al. |
| 2009/0106710 A1 | 4/2009 | Teig et al. |

OTHER PUBLICATIONS

International Search Report and Written Opinion correlating to PCT/IB2013/050153 issued on Oct. 16, 2013.

*Primary Examiner* — Thuan Do

(57) ABSTRACT

A method of performing logic synthesis of at least a part of an integrated circuit design. The method comprises identifying a first and at least one further module within the IC design that are mutually exclusive, selecting at least one register element within the first identified module and at least one register element within the at least one further identified module to be shared, and merging the first and at least one further mutually exclusive modules such that at least one common register element is shared between the first and at least one further mutually exclusive modules for the register elements selected to be shared.

13 Claims, 3 Drawing Sheets

METHOD AND APPARATUS FOR PERFORMING LOGIC SYNTHESIS

FIELD OF THE INVENTION

This invention relates to a method and apparatus for performing logic synthesis, and in particular to a method and apparatus for performing logic synthesis of at least a part of an integrated circuit (IC) design.

BACKGROUND OF THE INVENTION

Integrated circuit (IC) devices comprising, for example, application processors that are targeted at many different products are required to support many different peripheral capabilities. In order to support such peripheral capabilities, the IC devices are required to comprise appropriate peripheral modules therefor. However, in practice only a subset of the supported peripheral capabilities will actually be used in any one product, resulting in the respective peripheral modules being superfluous and unused. Such superfluous peripheral modules waste die area and also are an unnecessary additional source of leakage power within the IC device.

Whilst some peripheral modules can be designed to support multiple peripheral capabilities, it is often the case that the individual peripheral modules are provided by external vendors, and as such the cost of in-house re-design of a single peripheral module to support multiple peripheral capabilities is significantly higher than that of the area saving.

SUMMARY OF THE INVENTION

The present invention provides a method of performing logic synthesis of at least a part of an integrated circuit (IC) design, an apparatus comprising at least one signal processing module arranged to perform logic synthesis of at least a part of an integrated circuit (IC) design, an integrated circuit device, and a non-transitory computer program product having executable program code stored therein for performing logic synthesis of at least a part of an integrated circuit (IC) design as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
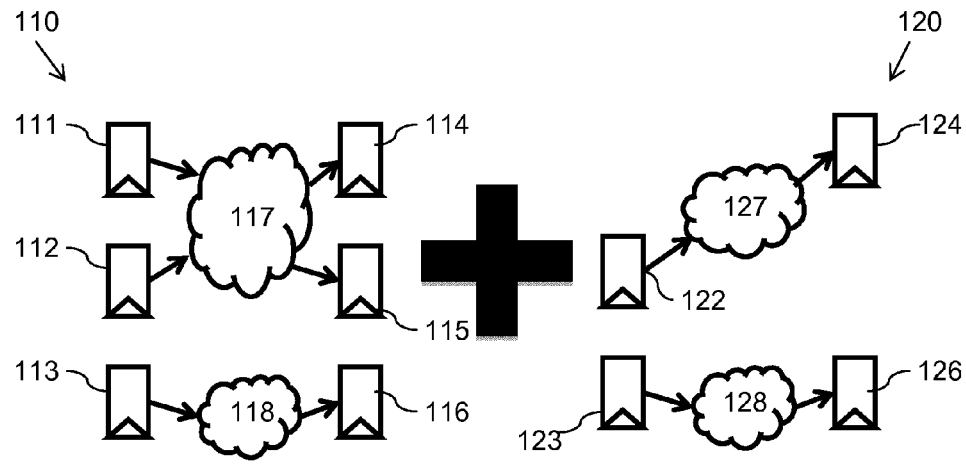
FIG. 1 illustrates a simplified example of integrated circuit modules.

The present invention will now be described with reference to the accompanying drawings in which examples of a method and apparatus for performing logic synthesis of an integrated circuit (IC) design are described and illustrated. However, it will be appreciated that the present invention is not limited to the specific examples illustrated and described herein. For example, the present invention is not limited to performing logic synthesis based on register transfer level design abstractions and gate level netlists as herein described in relation to the illustrated examples, and it will be appreciated that any suitable formats for describing the integrated circuit design functionality and/or gate level implementation may be used Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Digital Integrated Circuit (IC) design comprises various phases. Typically, a first phase comprises the system-level design phase in which the functional requirements of the, or each, IC module are defined. Next, the functional requirements are converted into a behavioural abstraction of circuits within the IC design, such as in the form of one or more register transfer level (RTL) description(s). RTL descriptions are well known in the art, and are often used to model synchronous digital circuits in terms of the flow of digital signals between hardware registers, and the logical operations performed on those signals. A logic design phase then typically comprises some form of logic synthesis whereby the behavioural abstraction (e.g. RTL description) of the IC design produces a gate level implementation thereof, for example comprising one or more gate level netlists. Finally, placement and routing of the gate level implementation is performed whereby the gates and interconnections are laid out on the die area.

In accordance with some examples of the present invention, there is provided a method and apparatus for performing logic synthesis of at least a part of an integrated circuit (IC) design. The method comprises identifying a first and at least one further module within the IC design that are mutually exclusive, selecting at least one register element within the first identified module and at least one register element within the at least one further identified module to be shared, and merging the first and at least one further mutually exclusive modules such that at least one common register element is shared between the first and at least one further mutually exclusive modules for the register elements selected to be shared.

In this manner, the number of register elements required to implement the plurality of mutually exclusive modules within a single IC design may be reduced, thereby reducing the overall die area required for the mutually exclusive modules, as well as the leakage power therefor.

In some examples, the method may comprise selecting register elements to be shared based at least partly on the register elements comprising analogous clock signal requirements. For example, the method may comprise selecting register elements to be shared based at least partly on the register elements being part of a common clock gating group. Additionally/alternatively, the method may comprise selecting register elements to be shared based at least partly on layout considerations for the first and at least one further mutually exclusive modules.

In some examples, merging the first and at least one further mutually exclusive modules may comprise copying non-shared elements from each of the first and at least one further mutually exclusive modules. Furthermore, merging the first and at least one further mutually exclusive modules may comprise branching an output of the at least one common register element to respective non-shared elements of each of the first and at least one further mutually exclusive modules. Additionally/alternatively, merging the first and at least one further mutually exclusive modules may comprise routing inputs to the at least one common register element through at least one multiplexing component. Furthermore, the method may comprise configuring control signals for the at least one multiplexing component to enable selection of individual module functionality.

In some examples, merging the first and at least one further mutually exclusive modules may be performed prior to insertion of clock gating.

In some examples, the method may further comprise performing logic equivalence comparison for each of the first and at least one further merged modules.

According to a further aspect of the invention there is provided an integrated circuit device comprising a first and at least one further mutually exclusive modules, wherein the first and at least one further mutually exclusive modules share at least one common register element implemented in accordance with the above method.

Referring now to FIG. 1, there is illustrated a simplified example of a first IC module, module A 110 and a second IC module, module B 120. Typically such IC modules comprise two kinds of elements: register elements and combinational logic elements. Register elements synchronize module functionality to one or more clock signals (not shown), and have memory properties. Register elements are typically implemented as D flip-flops. Combinational logic elements perform the various logical functions of the module and typically consist of logic gates and the like.

In the illustrated example, module A 110 is illustrated as comprising six register elements 111-116 and combination logic illustrated generally at 117 and 118, whilst module B 120 is illustrated as comprising four register elements 122-124, 126 and combination logic illustrated generally at 127 and 128. As outlined above, in accordance with some examples of the invention there is provided a method and apparatus for performing logic synthesis comprising identifying mutually exclusive modules within an IC design, selecting register elements within the mutually exclusive modules to be shared, and merging the mutually exclusive modules such that common register elements are shared between the mutually exclusive modules for the register elements selected to be shared.

Figure 2:
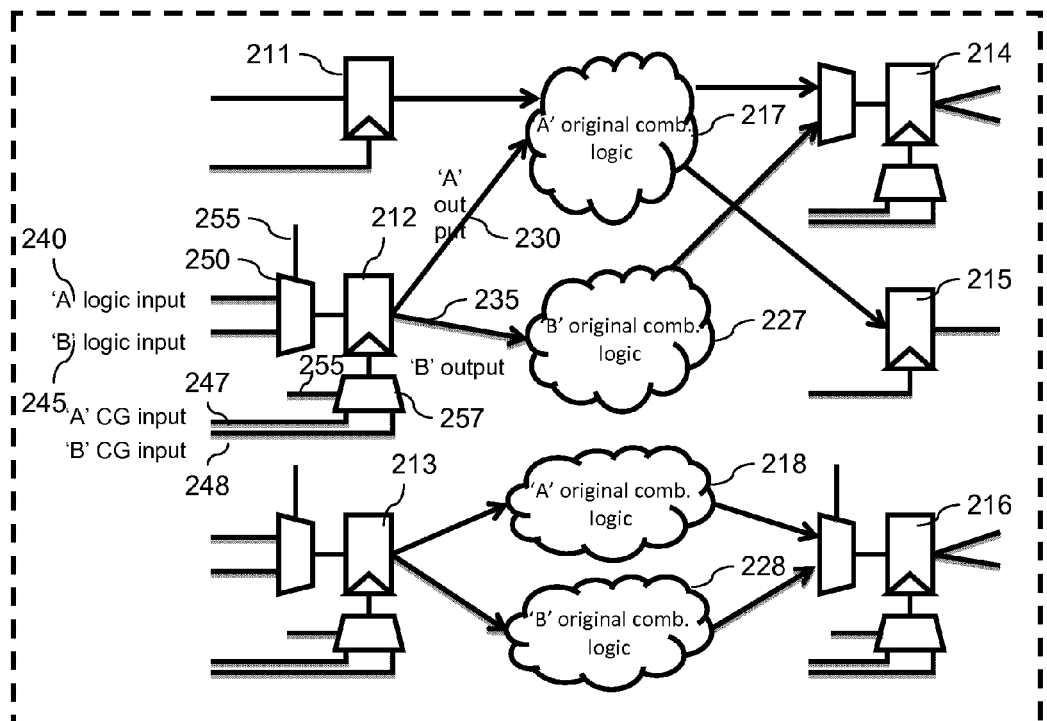
FIG. 2 illustrates a simplified example of merged modules within an integrated circuit device.

FIG. 2 illustrates a simplified example of an integrated circuit device 200 within which the modules A and B 110, 120 of FIG. 1 have been implemented in accordance with some examples of the invention. In the illustrated example, the IC device 200 comprises common register elements 212, 213, 214 and 216 which are shared between the two modules 110, 120. In particular, common register element 212 is shared for register elements 112 and 122 of modules A 110 and B 120 respectively; common register element 213 is shared for register elements 113, 123 of modules A 110 and B 120 respectively; common register element 214 is shared for register elements 114, 124 of modules A 110 and B 120 respectively; and common register element 216 is shared for register elements 116, 126 of modules A 110 and B120 respectively.

Thus, in this manner, the two modules 110, 120 have been effectively merged, with non-shared elements of the two modules, such as register elements 111, 115 of module A 110 and the combinational logic 117, 118, 127, 128 of both modules 110, 120 in the illustrated example, being implemented substantially alongside one another within the IC device 200, as illustrated at 211, 215, 217, 218, 227, and 228 in FIG. 2 respectively. In the illustrated example, such merging of the two modules 110, 120 also comprises branching outputs of the common register elements 212, 213, 214 and 216 to respective non-shared elements of each of the two modules 110, 120, such as illustrated at 230, 235 for the output of common register element 212. Additionally in the illustrated example, merging the modules 110, 120 comprises routing inputs (data and/or clock inputs) to the common register elements 212, 213, 214 and 216 through multiplexing components. In the illustrated example, data inputs 240, 245 for the respective modules 110, 120 to the common register element 212 are routed through multiplexing component 250, and clock inputs 247, 249 for the respective modules 110, 120 to the common register element 212 are routed through multiplexing component 257. Furthermore, a common control signal 255 for the input multiplexing components 250, 257 may be configured to enable selection of individual module functionality, whereby the common register elements 212, 213, 214 and 216 are collectively configurable to be operably coupled to respective inputs of module A 110 or module B 120 in accordance with the common control signal 255.

In this manner, the number of register elements required to implement the merged modules 110, 120 within the IC device 200 may be reduced compared to separately implementing the two modules within the IC device 200. Accordingly the total die area for implementing the two functional modules may be significantly reduced, as well as reducing leakage power for the IC device 200.

Figure 3:
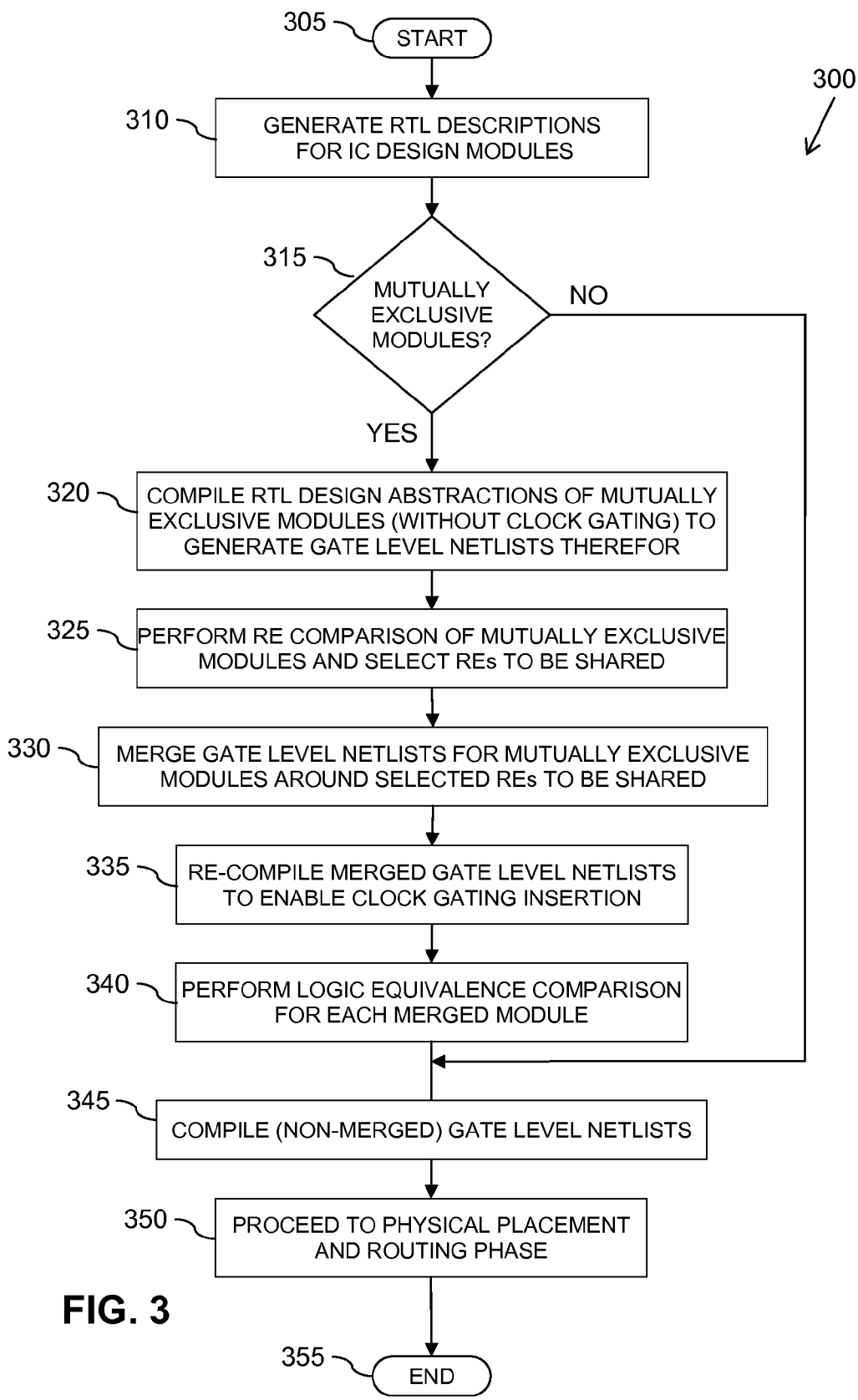
FIGS. 3 and 4 illustrate simplified flowcharts of an example of a method of performing logic synthesis.
Figure 4:
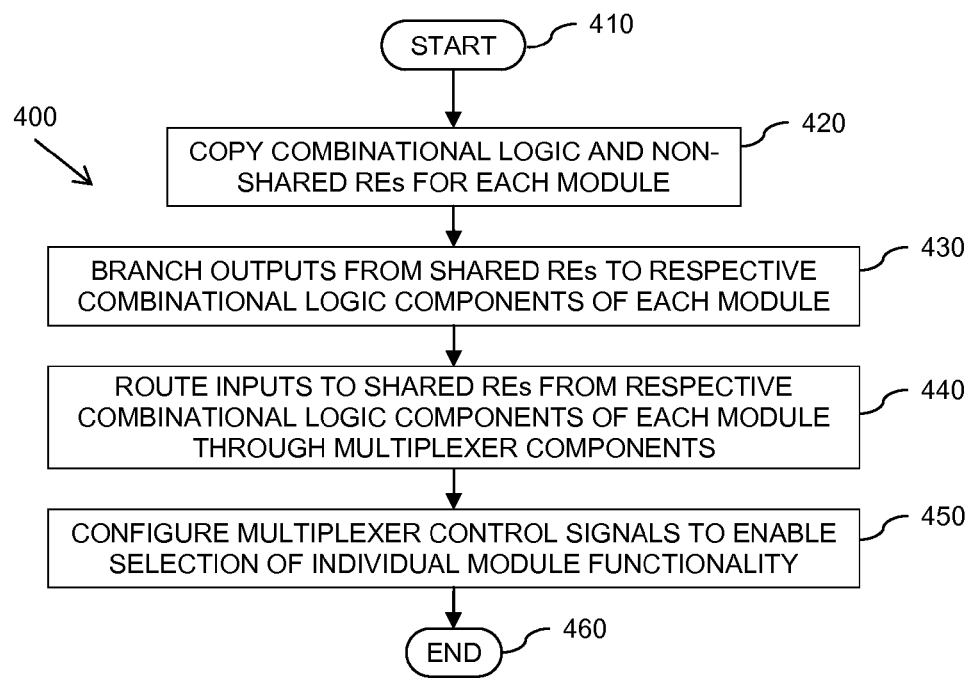

Referring now to FIGS. 3 and 4, there are illustrated simplified flowcharts 300, 400 of an example of a method of performing logic synthesis of at least a part of an integrated circuit, IC, design. The method starts at 305 in FIG. 3 and moves on to 310 where behavioural abstractions for modules within the IC design are generated, which in the illustrated example are in the form of RTL descriptions. Next, at 315, mutually exclusive modules within the IC design are identified. Modules may be mutually exclusive if target products for the IC design will only make use of one of those modules. Additionally/alternatively, modules may be mutually exclusive if only one of those modules will be used at any given time. Example of modules that may be mutually exclusive may comprise, for example, an asynchronous sample rate converter (used to convert the sampling rate of a signal associated to an input clock into a signal associated to a different output clock) and a pulse width modulation module (used to generate a toggling signal whose frequency and duty cycle can be modulated by programming appropriate registers). Typically such modules are not used at the same time, and thus may be considered to be mutually exclusive If no mutually exclusive modules are identified, the method may then move on to 345 where the RTL descriptions of the various modules of the IC design are compiled, before proceeding to the physical placement and routing phase of the design process at 350. The method then ends, at 355.

Referring back to 315, if at least two modules are identified as being mutually exclusive, the method moves on to 320 where, in the illustrated example, the RTL descriptions for (at least) the mutually exclusive modules are compiled to generate gate level netlists therefor. A comparison of register elements of the mutually exclusive modules is then performed and register elements to be shared are selected, at 325. For example, in the example illustrated in FIGS. 1 and 2, register elements 112 and 122 might be selected to be shared, register elements 113 and 123 might be selected to be shared, register elements 114, 124 might be selected to be shared, and register elements 116 and 126 might be selected to be shared. Register elements to be shared may be selected on any suitable and/or appropriate characteristics. For example, register elements to be shared may be selected based on the register elements comprising analogous clock signal requirements in order to simplify a clock distribution network of the IC design. Additionally/alternatively, register elements to be shared may be selected based on the register elements being part of a common clock gating group in order to simplify/optimise clock gating within the IC design. Additionally/alternatively, register elements to be shared may be selected based on layout considerations for the mutually exclusive modules, for example in order to maximise/optimise the area savings achieved through the merging of the mutually exclusive modules. It is contemplated that the selection of register elements to be shared may be at least partially automated. Additionally/alternatively, the selection of register elements to be shared may be at least partially performed manually by a user.

Having selected the register elements to be shared, the method moves on to 330 where the mutually exclusive modules are merged around the register elements selected to be shared, such that one or more common register element(s) is/are shared between the mutually exclusive modules for the register elements selected to be shared. FIG. 4 illustrates a simplified flowchart 400 of an example of a method of merging the mutually exclusive modules. The example illustrated in FIG. 4 starts at 410 and moves on to 420 where the merging of the mutually exclusive modules comprises copying non-shared elements, such as combinational logic elements and register elements not selected to be shared, from each of the mutually exclusive modules. Next, at 430, the merging of the mutually exclusive modules comprises branching the output(s) of the common register element(s) to respective non-shared elements of each of the mutually exclusive modules. Next, at 440, the merging of the mutually exclusive modules comprises routing inputs to the common register element(s) through one or more multiplexing component(s). Next, at 450, control signals for the multiplexing component(s) are configured to enable selection of individual module functionality. The method of FIG. 4 then ends at 460. The merging of the mutually exclusive modules may be performed by way of generating a gate level netlist describing the elements and connectivity of the merged modules.

Referring back to FIG. 3, in the illustrated example, the compiling of the RTL descriptions of the mutually exclusive modules at 320 is performed without the insertion of clock gating in order to avoid unnecessary complexities in merging the mutually exclusive modules. Accordingly, in the illustrated example, having performed the merging of the mutually exclusive modules, the method moves on to 335, where in the illustrated example the merged gate level netlist(s) are re-compiled to enable the insertion of clock gating for the merged modules. Thus, the merging of the mutually exclusive modules is performed prior to insertion of clock gating.

Next, at 340, the method further comprises performing logic equivalence comparison for each of the merged modules in order to ensure that the merged instance of each module exhibits the same functional behaviour as the respective original, unmerged module. The method then moves on to 345 where the RTL descriptions of any non-merged modules of the IC design (e.g. modules that were not identified as being mutually exclusive at 315) are compiled, before proceeding to the physical placement and routing phase of the design process at 350. The method then ends, at 355.

Figure 5:
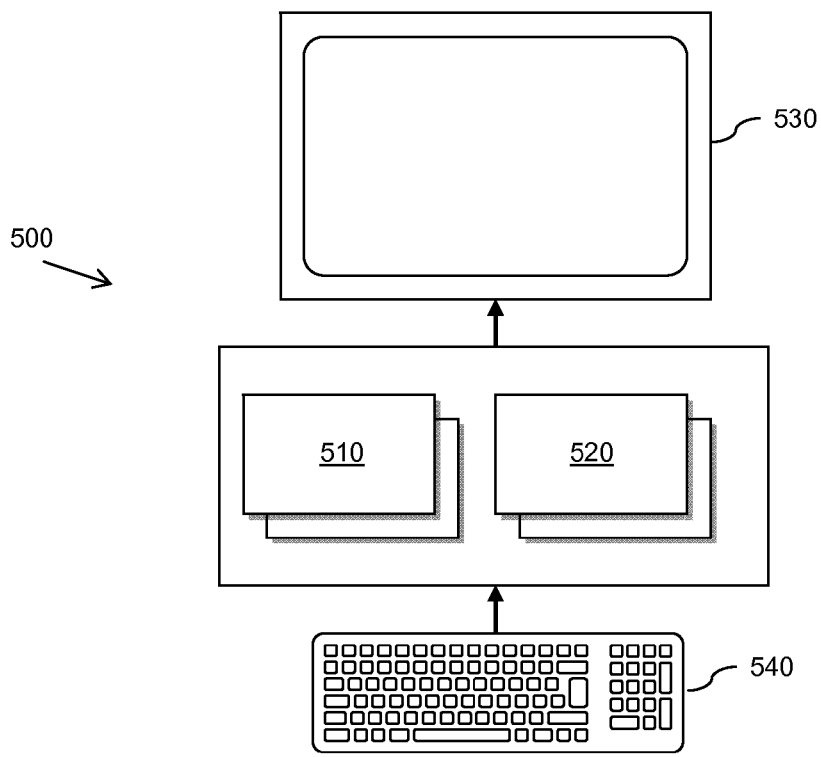
FIG. 5 illustrates a simplified block diagram of an example of an apparatus arranged to perform a method of performing logic synthesis.

Referring now to FIG. 5, there is illustrated a simplified block diagram of an example of an apparatus 500 arranged to perform a method of performing logic synthesis of at least a part of an integrated circuit design, such as the method illustrated in FIGS. 2 and 4 and described above. In the illustrated example, the apparatus comprises one or more signal processing modules 510 operably coupled to one or more memory elements 520. The apparatus may further comprise one or more user interface components, such as a display 530 and keyboard 540. The signal processing module(s) may be arranged to execute computer program code stored within the memory element(s) 520. The memory element(s) 520 may comprise any form of non-transitory computer program product, such as a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

In some examples, the signal processing module(s) 510 is/are arranged to execute computer program code operable for identifying a first and at least one further module within the IC design that are mutually exclusive, selecting at least one register element within the first identified module and at least one register element within the at least one further identified module to be shared, and merging the first and at least one further mutually exclusive modules such that at least one common register element is shared between the first and at least one further mutually exclusive modules for the register elements selected to be shared.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of designing at least a part of an integrated circuit, IC, design, the method comprising:
   identifying a first and at least one further module within the IC design that are mutually exclusive;
   selecting at least one register within the first identified module and at least one register within the at least one further identified module to be shared;
   merging the first and at least one further mutually exclusive modules such that a register is shared between the first and at least one further mutually exclusive modules for the registers selected to be shared;
   generating, by a signal processing module arranged to perform logic synthesis, a merged gate level netlist for the first and at least one further mutually exclusive modules; and
   outputting a merged gate level netlist to a subsequent design phase.

2. The method of claim 1, wherein the method comprises selecting registers to be shared based at least partly on the registers comprising analogous clock signal requirements.

3. The method of claim 2, wherein the method comprises selecting registers to be shared based at least partly on the registers being part of a common clock gating group.

4. The method of claim 1, wherein the method comprises selecting registers to be shared based at least partly on layout considerations for the first and at least one further mutually exclusive modules.

5. The method of claim 1, wherein merging the first and at least one further mutually exclusive modules comprises copying non-shared elements from each of the first and at least one further mutually exclusive modules.

6. The method of claim 5, wherein merging the first and at least one further mutually exclusive modules comprises branching an output of the at least one register to respective non-shared elements of each of the first and at least one further mutually exclusive modules.

7. The method of claim 5, wherein merging the first and at least one further mutually exclusive modules comprises routing inputs to the register through at least one multiplexing component.

8. The method of claim 7, wherein the method comprises configuring control signals for the at least one multiplexing component to enable selection of individual module functionality.

9. The method of claim 1, wherein merging the first and at least one further mutually exclusive modules is performed prior to insertion of clock gating.

10. The method of claim 1, wherein the method further comprises performing logic equivalence comparison for each of the first and at least one further merged modules.

11. An integrated circuit device comprising a first and at least one further mutually exclusive modules, wherein the first and at least one further mutually exclusive modules share the register implemented in accordance with the method of claim 1.

12. An apparatus comprising at least one signal processing module arranged to perform logic synthesis of at least a part of an integrated circuit, IC, design, the at least one signal processing module being arranged to:
   identify a first and at least one further module within the IC design that are mutually exclusive;
   select at least one register within the first identified module and at least one register within the at least one further identified module to be shared; and
   merge the first and at least one further mutually exclusive modules such that a register is shared between the first and at least one further mutually exclusive modules for the registers selected to be shared.

13. A non-transitory readable storage medium computer program product having executable program code stored therein for performing logic synthesis of at least a part of an integrated circuit, IC, design, the program code operable for:
   identifying a first and at least one further module within the IC design that are mutually exclusive;

selecting at least one register within the first identified module and at least one register within the at least one further identified module to be shared; and merging the first and at least one further mutually exclusive modules such that a register is shared between the first and at least one further mutually exclusive modules for the registers selected to be shared.

* * * * *